Oct. 26, 1954
H. P. HOLT
2,692,771
CHECK LINK FOR WEIGHING SCALES
Filed Jan. 7, 1952
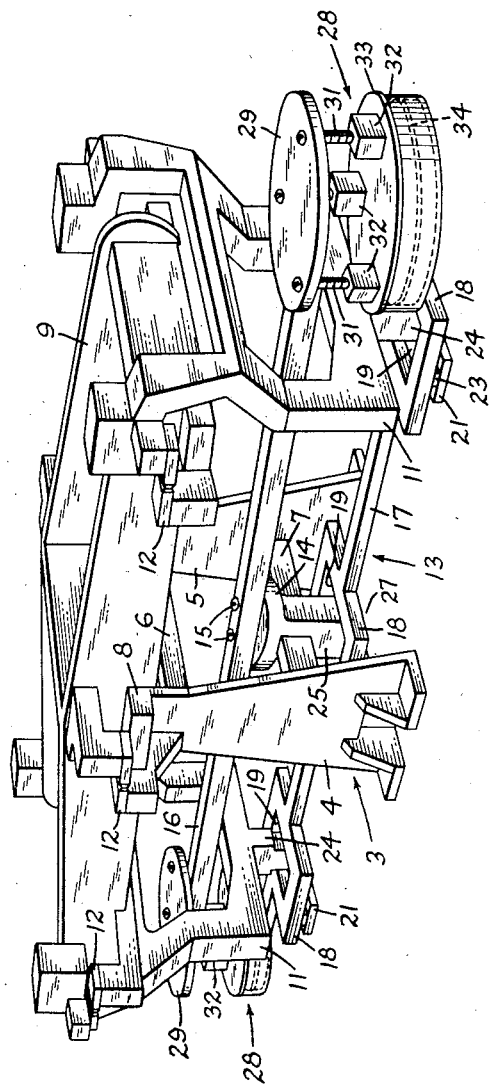
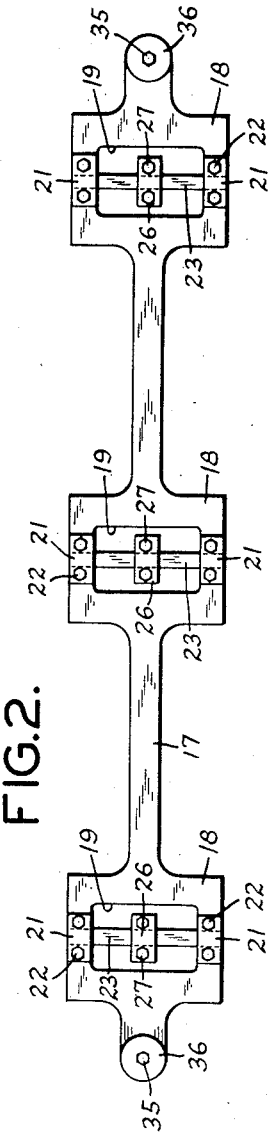
INVENTOR.
HAROLD P. HOLT
BY
*Henry Sherman*
ATTORNEY.

Patented Oct. 26, 1954

2,692,771

UNITED STATES PATENT OFFICE 2,692,771

CHECK LINK FOR WEIGHING SCALES

Harold P. Holt, Burlington, Vt., assignor to H. A. Hadley Associates Inc., Burlington, Vt., a corporation of Vermont Application January 7, 1952, Serial No. 265,233

6 Claims. (Cl. 265—49)

This invention relates to weighing scales, and relates more particularly to an improved check link construction for weighing scales, especially for weighing scales of the equal-arm balance type.

In weighing scales of the type with which the present invention is concerned an equal-arm lever is provided with knife edge fulcrum pivots which are supported on suitable bearings carried on a fulcrum stand. At each end of the lever is fixed a load pivot on the knife edges of which are carried end-parallels or stirrups. The stirrups support at their upper ends the load and counterweight platforms, and the lower ends of the stirrups are connected by a check link. The primary function of the check link is to maintain the parallelogram relationship described by the scale elements, a parallelogram being formed by the longitudinal center line of the lever, the vertical center lines of the stirrups and the longitudinal center line of the check line, and two parallelograms being formed by splitting the foregoing parallelogram by a vertical line passing through the fulcrum pivot line and through the central pivot line of the check line. It is about this latter vertical line that the lever, the stirrups and the check link tilt during the operation of the weighing scale. By maintaining the parallelogram relationship of the scale elements, there are avoided errors which arise when the load and counterweight platforms are loaded unequally or when the loads are placed off-center thereon. However, one of the difficulties heretofore encountered is that friction is present particularly at the points where the check link is connected to the stirrups. This friction causes a change in the distance between the connection and central pivot line of the check link, thus introducing errors of weighing into the scale.

It is an object of my invention to provide a check link construction which will be free from the foregoing and other disadvantages and which will be especially simple in construction and efficient in use.

Another object of this invention is the provision of a check link construction which may be connected to the scale elements in a novel manner whereby the distances between the connections of the stirrups and of the central pivot line of the check link remains fixed and no friction is introduced into the scale.

Other objects of my invention, together with certain details of construction and combinations of parts, will be apparent from the following detailed description and will be pointed out in the appended claims.

In the drawings wherein a preferred embodiment of my invention is shown,

Fig. 1 is a perspective view of an equal-arm balance with certain parts, unnecessary for the exposition of my invention, omitted, and Fig. 2 is a bottom plan view of my novel check link and connections only.

Like reference numerals indicate like parts throughout both views of the drawing.

Referring now to the drawings for a detailed description of my invention, the reference numeral 3 indicates generally a fulcrum stand which comprises two vertical standards 4 and 5 connected by integral cross-pieces 6 and 7. The upper extremities of the standards 4 and 5 are each provided with an integral right angled extension 8 which carries thereon or has affixed thereto a flat bearing member, the bearing members on the two standards supporting the knife edges of the fulcrum pivots mounted in equal-arm lever 9. On the extremities of the lever 9 are fixed load pivots for pivotally supporting stirrups 11. The pivot and bearing arrangement, including the fulcrum member 12 for preventing the shifting of the knife, is described and claimed in the co-pending application of Harlan A. Hadley, S. No. 80,025, filed March 7, 1949, now Patent No. 2,611,661.

In weighing scales of the type with which my invention is concerned there is usually provided a check link arrangement for maintaining the load and counterweight receiving platforms mounted on the stirrups in the desired position. In accordance with my invention, I have provided a novel check link arrangement, indicated generally by reference numeral 13 which will be hereinafter more fully described.

The cross-piece 7 of the fulcrum stand 3 is provided with a boss 14 to which is fixed, as by screws 15, a longitudinally extending bar 16 of such length that it extrudes through and beyond the stirrups 11.

The check link arrangement of my invention comprises a longitudinally extending bar 17 having in the center thereof and adjacent to each of its extremities an enlarged portion 18 in the horizontal plane of said bar, said enlarged portions being provided with a substantially rectangular opening 19. Across the long axis of each of the openings 19 is attached, as by means of clamps 21 and bolts 22, a taper or band 23 of a suitable metal such as steel, for example. The bands 23 are attached to depending integral tongues 24 of stirrups 11 and depending integral tongue 25 of the cross-piece 7 by means of clamps 26 and bolts 27. The structure of the check link and the manner of its attachment to the stirrups and the cross-piece make for a floating, frictionless arrangement in which the fixed distances between the center pivot line and the stirrups are always maintained regardless of the position of the lever and stirrups, i. e. the deflection thereof.

To dampen the vibrations of lever 9, an air dashpot arrangement, indicated generally by reference numeral 28, is provided, one on each side of the scale. Each dashpot construction comprises a disk 29 fixed to an extremity of the fixed bar 16. A plurality of short rods 31 are fixed to and depend from said disk 29 and each rod has mounted thereon a block 32. The blocks 32 support a short cylindrical cup 33. The cup 33 is relatively stationary and is adapted to receive therein a plate 34 which plate is suitably attached, as by a bolt 35, to integral projections 36 at the ends of check link bar 17. As the check link is moved about its central axis, the plates 34 move within and relative to the cups 33 and dampen the vibrations of the lever 9.

It is to be understood that the bar 17 may be made in two parts with the central opening made up of two U-shaped sections, the arms telescoping or overlapping each other in order to adjust the operative length of the check link wherever a different effective length thereof is desired or necessary.

The embodiment of my invention above described in connection with the showing in the drawings is to be regarded as illustrative only, since my invention is susceptible of variations, modification and change within the spirit and scope of the appended claims.

What I claim as new and desire to secure by Letters Patent is:

1. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever and a plurality of bands fixed to and extending laterally across the horizontal axis of said bar, one of said bands being positively fixed to said fulcrum stand and the others of said bands being operatively connected to said stirrups respectively.

2. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever and a plurality of bands fixed to and extending laterally across the horizontal axis of said bar, one of said bands being positively fixed to said fulcrum stand and the others of said bands being separately fixed to said stirrups respectively.

3. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever, said bar having a plurality of spaced openings positioned along the longitudinal axis of said bar, tongues on said fulcrum stand and said stirrups extending into said openings, and a band attached to said bar across each of said openings, said bands being positively fixed to said tongues within said openings.

4. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever, said bar having a plurality of spaced openings positioned along the longitudinal axis of said bar, integral tongues on said fulcrum stand and said stirrups extending into said openings and a flat metal band attached to said bar across each of said openings in a direction normal to said longitudinal axis of said bar, said bands being positively fixed to said tongues within said openings.

5. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever, said bar having a plurality of enlarged portions spaced along the longitudinal axis of said bar, said enlarged portions having openings therein, tongues depending from said fulcrum stand and said stirrups into said openings, and a band attached to said bar across each of said openings, said bands being positively fixed to said tongues within said openings.

6. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever, said bar having a plurality of enlarged portions spaced along the longitudinal axis of said bar, said enlarged portions having openings therein, integral tongues depending from said fulcrum stand and said stirrups into said openings, and a flat metal band attached to said bar across each of said openings in a direction normal to said longitudinal axis of said bar, said bands being positively fixed to said tongues within said openings.

References Cited in the file of this patent

UNITED STATES PATENTS

| Number | Name | Date |
| --- | --- | --- |
| 1,351,449 | Stevens | Aug. 31, 1920 |
| 2,144,845 | Kniesche | Jan. 24, 1939 |
| 2,503,697 | Weckerly | Apr. 11, 1950 |

FOREIGN PATENTS

| Number | Country | Date |
| --- | --- | --- |
| 997,311 | France | Sept. 12, 1951 |